No. 888,233. PATENTED MAY 19, 1908.
C. O. GAMMON.
COMPUTING YARD MEASURE.
APPLICATION FILED FEB. 13, 1908.
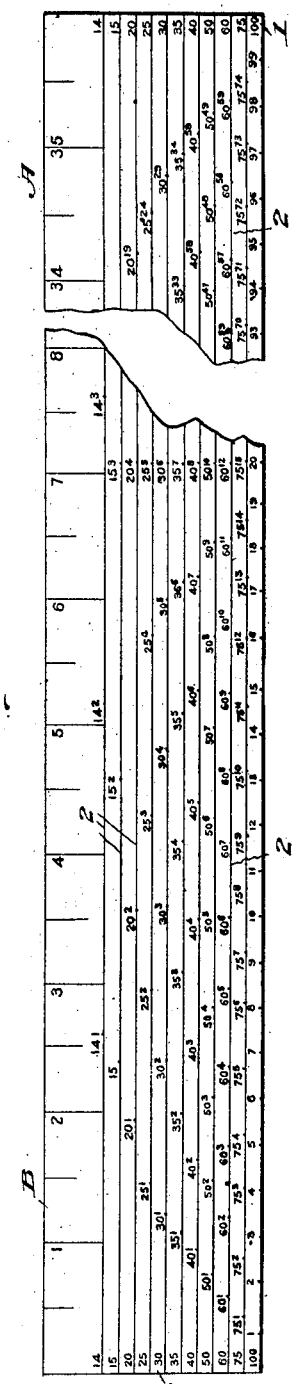
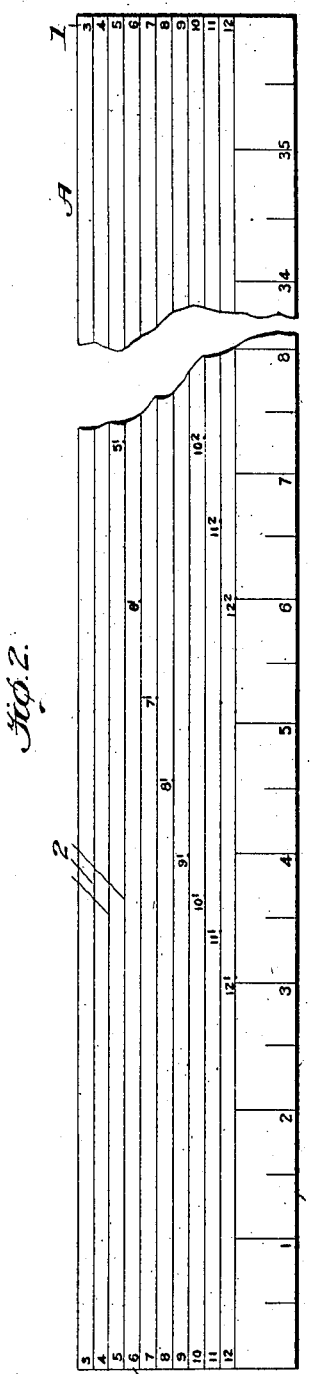

UNITED STATES PATENT OFFICE.

CHARLES O. GAMMON, OF BUFFALO, MISSOURI.

COMPUTING YARD-MEASURE.

No. 888,233.    Specification of Letters Patent.    Patented May 19, 1908.

Application filed February 13, 1908. Serial No. 415,718.

*To all whom it may concern:*

Be it known that I, CHARLES O. GAMMON, a citizen of the United States, residing at Buffalo, in the county of Dallas and State of Missouri, have invented certain new and useful Improvements in Computing Yard-Measures, of which the following is a specification.

My invention relates to an improvement in computing yard measures, and has for its object to provide means whereby dry goods and the like can be measured and the price of any quality of goods be determined for any fractional part of a yard without the necessity of mental calculation.

By my improved computing measure the cloth can be measured off for the desired length and by referring to the measure below the scale indicating the length of the material, the price is at once readily ascertained for the fractional part of the yard, which price is always opposite the price of the goods per yard.

The invention relates to certain novel features of construction and combinations of parts which will be hereinafter described and pointed out in the claims.

In the accompanying drawings Figure 1 is a view of one side of my improved yard measure, and Fig. 2 is a similar view showing the other side of the measure.

A, represents the measure, which is preferably in lengths of a yard having a yard scale along one edge, as at B. At the ends of the measure and in a vertical column 1, 1 the price per yard is given from three cents up to $1.00. Of course the price can be placed upon the measure to suit the requirements and desires of the merchant.

Horizontal lines 2, 2 extend the length of the measure and upon these lines the price per yard, at each end of the measure, is placed.

Extending in a horizontal column or space are the figures or prices preferably over the indicating symbol or dot for indicating the price for the fractional part or unit of a yard of the cloth. Before this price, which ranges from one cent up, is placed the price per yard. The price per yard and the price for a fractional part of a yard are placed together over the indicating symbol and on the horizontal line, thereby giving the salesman the price per yard and the price for the fractional part of a yard without the necessity of his having to refer to the end or ends of the yard measure to determine the cost per yard and the line upon which this price is placed and then determining the cost for the fractional portion, as the price per yard and the price for a fractional part thereof are together, and the price for the fractional part is designated by a dot or symbol, whereby it can be readily determined without any confusion what is the price for the fractional portion of the yard.

To briefly illustrate the principle of the invention, the salesman will place the measure over the goods to be sold and measuring off the quantity desired by the purchaser, at the point or length desired it will, of course, register on the measure, and if the goods sell for 50 cents per yard and the purchaser desires 18 inches of the goods, by referring to the horizontal lines on a transverse line with the numeral 18 and on the horizontal line of the goods the cost will be found to be 25 cents, which is over the dot or symbol which indicates that the cost for 18 inches of the goods would be 25 cents for the 50 cent per yard goods.

All of the transverse lines have the price per yard before the price for the fractional part or portion of the yard of the material to be sold, excepting the price of a dollar per yard. As this is the last horizontal line on the measure it is not deemed necessary to place the price before the fractional price per yard.

With the ordinary method of estimating the price for a fractional part of a yard the salesman simply conjectures about the cuts and lengths of the cloth and ofttimes not really knowing whether it is correct or not, as he is often in a great hurry and mistakes are apt to be made, but by my improvement the price per yard can be readily ascertained and for any fractional part thereof.

It is evident that slight changes might be resorted to in the form and arrangement of the several parts described without departing from the spirit and scope of my invention, and hence I do not wish to limit myself to the exact construction herein set forth, but:—

Having fully described my invention, what I claim as new and desire to secure by Letters Patent is:—

1. A computing measure comprising horizontal columns bearing at the ends characters showing the selling price of goods per unit of measure, a measuring scale, the selling price and price for a fractional part of the unit of measurement on the horizontal columns, and a symbol for indicating the price of goods to be sold of a certain length.

2. A computing measure comprising horizontal columns bearing at the ends characters showing the selling price of goods per unit of measure, a measuring scale, the selling price and price for a fractional part of the unit of measurement on the horizontal columns, and a symbol for indicating the price of goods to be sold of a certain length beneath the same, said symbol registering in a vertical line with the scale.

In testimony whereof I affix my signature in presence of two witnesses.

CHARLES O. GAMMON.

Witnesses.
N. WRIGHT,
R. A. MORROW.